United States Patent [19]

Hanneken et al.

[11] 3,861,937
[45] Jan. 21, 1975

[54] METHOD OF PRODUCING SUEDE-LIKE SYNTHETIC LEATHERS

[75] Inventors: George Hanneken, Willingboro; Christian Wirth, Mount Holly, both of N.J.

[73] Assignee: Hooker Chemicals & Plastics Corp., Niagara Falls, N.Y.

[22] Filed: July 3, 1972

[21] Appl. No.: 268,290

[52] U.S. Cl. ............... 117/10, 117/11, 156/247
[51] Int. Cl. ..................... B44c 1/00, B44c 1/22
[58] Field of Search ............ 117/10, 11, 161 KP; 156/247, 249

[56] References Cited
UNITED STATES PATENTS

| | | | |
|---|---|---|---|
| 2,351,498 | 6/1944 | Fowler | 156/247 |
| 2,768,902 | 10/1956 | Scholl | 117/10 |
| 2,841,205 | 7/1958 | Bird | 154/37 |
| 2,983,960 | 5/1961 | Jilge | 117/10 X |
| 3,174,889 | 3/1965 | Anderson et al. | 156/254 |
| 3,190,766 | 6/1965 | Yuan | 117/10 X |
| 3,330,713 | 7/1967 | Watson et al. | 156/247 X |
| 3,434,861 | 3/1969 | Luc | 117/10 |
| 3,446,693 | 5/1969 | Alig et al. | 161/160 |
| 3,496,001 | 2/1970 | Minobe et al. | 117/11 |
| 3,542,617 | 11/1970 | Watson | 156/247 |
| 3,567,535 | 3/1971 | Noda et al. | 156/249 X |
| 3,600,260 | 8/1971 | Watanabe | 161/62 |
| 3,650,880 | 3/1972 | Tieniber | 156/247 X |

FOREIGN PATENTS OR APPLICATIONS

| | | |
|---|---|---|
| 1,186,975 | 4/1970 | Great Britain |
| 1,208,056 | 10/1970 | Great Britain |

*Primary Examiner*—William D. Martin
*Assistant Examiner*—Stuart D. Frankel
*Attorney, Agent, or Firm*—Peter F. Casella; James F. Mudd

[57] ABSTRACT

An artificial suede-like leather is produced by (1) coating an elastomeric polymer composition onto a temporary carrier member, (2) laminating a napped fabric or other suitable material onto the polymer coating, (3) drying and partially curing the polymer coating, (4) peeling the temporary carrier member from the coating, leaving a layer of the polymer coating on the surface of the carrier member and (5) subsequently curing the polymer layer remaining on the fabric to form an unitary article comprised of the fabric and the polymer layer. The elastomeric polymer can be a curable polyurethane elastomer or a mixture of other polymers with a curable elastomer. Alternately, a napped fabric can be coated in step (1) and a temporary carrier can be laminated onto the polymer coating in step (2) followed by steps (3–5) to produce an artifical suede leather.

10 Claims, No Drawings

METHOD OF PRODUCING SUEDE-LIKE SYNTHETIC LEATHERS

BACKGROUND OF THE INVENTION

1. Field of the Invention

This invention relates to the manufacture of suede-like artificial leather having the appearance of natural suede leather which in addition also has the softness and hand of natural suede, together with high moisture and air permeability and excellent abrasion resistance.

2. Description of Prior Art

Artificial suede leathers have been prepared by forming a honeycomb-like porous layer of polymeric material on a fibrous substrate and subsequently grinding off the surface layer of the porous coating layer as disclosed in U.S. Pat. No. 3,496,001.

Suede-like artificial leathers have also been made previously from flocked fabrics, the flocking being applied to an adhesive coated fabric by electrostatic deposition or by the application of a polymer in solution to a fibrous substrate followed by the steps of dipping the polymer solution layer into a solution of organic solvent which acts to coagulate the polymer and, at the same time, leaches out the solvent used to apply the polymer to the substrate. These steps result in a polymer layer having a relatively large spongy structure in the inner part. The exposed surface of the spongy structure is then adhered to a substrate, such as a fibrous material, and the spongy structure is split by pulling apart the two fibrous substrates adhered to the spongy structure in different directions so as to tear the polymer layer into two parts, thereby producing two suede-like sheets as disclosed in U.S. Pat. No. 3,567,535.

Other conventional methods of making artificial suede can involve leaching out of soluble salts previously incorporated into a polymer solution, used as a coating on fabric thereby creating voids in the polymer solution coating. Subsequent grinding away of the surface skin of the coated layer to expose a honeycomb-like structure is unnecessary as disclosed in U.S. Pat. No. 2,983,960.

SUMMARY OF THE INVENTION

In the present invention, an artificial suede-like leather is produced by coating a polymeric elastomeric coating composition onto a temporary carrier or alternately a napped fabric, laminating to the exposed surface a napped fabric or similar porous material or alternately a temporary carrier, and subsequently drying, or drying and partially curing, the elastomer coating. The fabric material is then pulled away from the temporary carrier. At the time of peeling, the elastomer is in a gum-like stage having low cohesive strength. This condition is distinguished from that obtained when the elastomer is subsequently fully cured. Upon peeling, a layer of polymer adheres to the carrier and the force of separation from the temporary support surface imparts an irregular surface having the appearance of suede leather to the polymer layer which remains on the fabric.

An embossing operation can be added to obtain a smooth suede. The embossing can take place before or after the peeling operation.

The process of this invention comprises the steps of:

a. applying a polymer coating of an elastomeric composition to a temporary support carrier which is wet by the elastomer.

b. laminating a napped fabric or similar porous material to the exposed surface layer of the curable elastomer, c. drying or drying and partially curing the curable elastomer, d. peeling the fabric from the temporary carrier leaving part of the polymer on the carrier surface and imparting the suede appearance as the result of irregular adhesion of a portion of the polymer coating to the temporary support carrier surface, e. optionally embossing to obtain a smooth surface on the suede-like leather material, and f. completing the cure of the curable elastomer, remaining on the fabric.

DESCRIPTION OF PREFERRED EMBODIMENTS

It is within the scope of the invention to use as the curable elastomer in the process of the invention, either alone or as mixtures, rubbers such as polyurethane rubber, natural rubber, synthetic polyisoprene, reclaimed rubber, polyisobutylene, acrylic rubber, chlorinated rubber, polybutadiene, cyclized rubber, butadieneacrylonitrile rubber, butadiene-styrene rubber, butyl rubber, neoprene (polychloroprene), and polysulfide rubber.

Any kind of polymer which has suitable pliability and strength can be used in combination with the curable elastomers of the invention. As polymers which can be mixed with the curable elastomers of the invention, polymers which are compatible with the curable elastomers or can be dissolved by the solvents used to dissolve the curable elastomers are preferred. Thus, mixtures with the curable polyurethane elastomers of various polymers such as vinyl polymers and copolymers illustrated by polyvinyl chloride, polyvinyl chlorideacetate, and polyvinylidene chloride, or polymers such as poly-alpha-methyl styrene, polyamides, polyesteramides, and polyesters are useful in the process of the invention.

The preferred curable elastomer of the invention comprises a mixture of a hydroxyl terminated polyester and a hydroxyl terminated polyurethane prepolymer. The hydroxyl terminated polyesters (polyols) preferably used in the practice of the present invention are prepared by polycondensation of an aromatic or aliphatic dicarboxylic acid and a molar excess of an aliphatic glycol. Hydroxyl terminated polyesters can also be prepared by ring opening polymerization of a cyclic ester in the presence of a difunctional compound as an initiator. Examples of polyesters obtained by polycondensation of an aromatic or aliphatic dicarboxylic acid and an aliphatic glycol are those polyesters obtained by reaction between phthalic acid, adipic acid, sebacic acid, maleic acid or like dicarboxylic acid and ethylene glycol, 1,2-propylene glycol, 1,4-butylene glycol, 1,3-butylene-glycol or like aliphatic diol. Examples of polyesters prepared by the ring opening polymerization of a cyclic ester in the presence of a difunctional compound are those polyesters prepared by polymerization of epsilon caprolactone, delta-methyl-epsilon-caprolactone, beta-propiolactone, or like cyclic ester in the presence of an initiator such as 1,4-butylene glycol, ethylene glycol, or diethylene glycol. The polyesters preferably contain at least two terminal hydroxyl groups and have a molecular weight of about 2,000 to about 10,000 preferably about 4,000 to about 8,000.

These polyester polyols can also be made by reacting acids, esters, or acid halides with glycols such as ethylene-, propylene-, tetramethylene glycol, substituted glycols such as 2,2-dimethyl-1,3-propanediol, cyclic glycols such as cyclohexanediol and aromatic glycols such as xylene glycol. Triols such as glycerol and trimethylol propane can be used in combination with the aforesaid glycols. The aliphatic glycols are generally preferred when maximum product flexibility is desired in the polyester. These glycols are reacted with aliphatic, cycloaliphatic or aromatic dicarboxylic acids or lower alkyl esters or ester forming derivatives thereof to produce relatively low molecular weight polymers, preferably having a melting point of less than about 70 degrees centigrade, and molecular weights like those indicated above. Examples of acids useful in preparing such polyesters are succinic, adipic, subaric, sebacic, terephthalic and hexahydroterephthalic acids, and the alkyl and halogen substituted derivatives thereof. While the rubber-like resilience obtained in these elastomeric polyols can vary widely, depending upon the chemical structure of the polymer and the materials used in preparing them, these materials are referred to as "elastomers." These polyols are used in the proportion of 20 to 70 percent based upon the weight of the curable polyurethane prepolymer. The flexibilizing polyol can be cured in the same manner as the hydroxyl terminated polyurethane prepolymers.

The hydroxyl terminated polyurethane prepolymer is preferably prepared by reacting a polyester glycol with an organic diisocyanate to form a hydroxy terminated prepolymer. The prepolymer and polyester mixture can be cured using various hydroxy reactive compounds such as hexakis methoxy methyl melamine or polyisocyanates. A catalyst may be included with the mixture to accelerate the rate of cure. An acidic catalyst for the melamine curative may be of a blocked type which becomes unblocked upon heating to cure temperature. An example of a blocked catalyst which is effective is the morpholine salt of toluene sulfonic acid. If polyisocyanates are used as curatives, they can also be blocked to permit high temperatures activation. Examples of useful blocking agents are phenol and methylethyl ketoxime.

As the organic polyisocyanate used in preparing the curable hydroxyl terminated polyurethane prepolymer, there preferably are used aromatic diisocyanates, such as diphenyl methane-p,p'-diisocyanate, 2,4- and 2,6-tolylene diisocyanates, and 1,5-naphthalene diisocyanate. In addition, aliphatic and cycloaliphatic diisocyanates or mixtures thereof can be used in forming the prepolymer. Such diisocyanates are, e.g., tetramethylene-1,4-diisocyanate, hexamethylene-1,6-diisocyanate, decamethylene-1,10-diisocyanate, cyclohexylene-1,4-diisocyanate, methylene bis(4-cyclohexyl isocyanate) and tetrahydronaphthalene diisocyanate.

Useful curable polyurethane elastomers can also be made by replacing all or part of the polymeric glycol with a simple, non-polymeric glycol, i.e., ethylene glycol or propylene glycol. The hydroxyl terminated polyurethane prepolymer can be prepared by, first, mixing a molar excess of the polyester with the active hydrogen containing polymeric material and heating the mixture at about 50 to 120 degrees centigrade until the prepolymer is formed. The prepolymers have a molecular weight of about 3,000 to about 30,000, preferably about 4,000 to about 10,000 if used as a coating material without diluting with organic solvent, and preferably about 15,000 to about 25,000 if organic solvent is used to dissolve the prepolymer before coating. Alternately, the diisocyanate can be reacted with a molar excess of the active hydrogen containing polymeric material, and subsequently the reaction product can be reacted with more diisocyanate to form a hydroxyl terminated prepolymer.

In the preferred process of the invention, an organic solvent solution comprising the curable polyurethane elastomer is applied at a thickness of from about 5 to about 25 mils, preferably to a temporary carrier support and a napped fabric is immediately laminated to the still-wet, fluid polymer coating. The curable polyurethane elastomer can also be applied in liquid form without dissolving it in organic solvent by use of the low molecular weight hydroxyl terminated polyurethane prepolymers described hereinbefore with the polyester polyols to make up the curable polyurethane elastomer. The coating is then dried for instance, in an oven, heated to a temperature of between 150° to 250° F and then the dried polymer film is torn apart, for instance, by winding the temporary carrier and the napped fabric onto separate rolls. Finally, the polymer coated fabric is cured by passing it through a second oven at a temperature of between 350° and 400° F. If a smooth finish suede is desired, the fabric coated with elastomeric polyurethane can be passed through embossing rolls prior to the final curing operation.

Various fibrous substrates such as woven, knitted or nonwoven fabric may be used as the substrate. The fabric can be made of natural or synthetic fibers such as cellulosic fibers, jute, cotton, wool, nylon, polyester, rayon, acetates, polyurethanes, acrylics and polyolefins. Moreover, other cellulosic materials can be used as the fabric material such as paper, cardboard, and the like. Also useful are foamed materials such as expanded vinyl, foamed polyurethane and foamed rubber sheets.

The solution comprising the curable polyurethane elastomer can also contain a cross-linking agent such as an end-blocked polyurethane, as described above, surface active agents and slip additives, such as silicon oils, and other additives such as pigments which can include such materials as talc, carbon black, calcium carbonate, clay, etc. Dyes, colorants and flame-retarding agents can also be included. A specific example of a blocked polyurethane cross-linking agent is the adduct of a triol such as glycerol with methylene dicyclohexyl diisocyanate end-blocked by reaction with methylethyl ketoxime. The amount of potentially reactive end-blocked polyurethane useful in preparing the artificial suede-like leather for the present invention is in the range from about 5 to about 15 percent by weight based upon the total weight of the urethane component of the coating composition. About 7 to about 10 percent of the end-blocked polyurethane is preferred.

The end-blocked polyurethanes may be difunctional, trifunctional, or polyfunctional. Examples of difunctional end-blocked polyurethanes are as follows: the adducts of 1 mole of polypropylene glycol of molecular weight 2,000 or 425, each reacted with 2 moles of toluene diisocyanate and end-blocked with methylethyl ketoxime. Examples of trifunctional end-blocked polyurethanes are as follows: the adducts of 1 mole of triols prepared by the oxypropylation of trimethylolpropane, to molecular weights of 300 or 4100, each reacted with 3 moles of toluene diisocyanate and end blocked with methylethyl ketoxime. An example of a polyfunctional end-blocked polyurethane is as follows: the adduct of a tetrol prepared by oxypropylation of pentaerythritol to a molecular weight of 500 with 4 moles of toluene diisocyanate and end-blocked with methylethyl ketoxime. End-blocked polyurethane crosslinking agents can also be prepared using such alternates to methylethyl ketoxime as phenol, mono-, di-, or trichlorophenols, meta-nitrophenol, ortho-nitrophenol, resorcinol, meta-cresol, para-chlorophenol, guaiacol, 1-dodecane thiol, benzene thiol, ethyl aceto-acetate, diethyl malonate, caprolactone, epsilon-caprolactone, ethyl carbamate, boric acid, catechol, phloroglucinol, ethyl malonate, acetyl acetone, thionaphthalene, octyl-phenol, isooctyl phenol, 4-hydroxy biphenyl, alpha-pyrrolidone, dialkyl amines of 2 to 4 carbon atoms, such as diethylene amine, di-n-propylamine diisopropylamine, and dibutylamine, alkanols of 2 to 4 carbon atoms, such as ethanol, propanol, butanol, and 2-methyl-2-propanol. Thus, 1 mole of a triol prepared by the oxypropylation of trimethylolpropane to a molecular weight of 950 can be reacted with 3 moles of toluene diisocyanate and end-blocked by reaction with phenol, or, alternately, dietheylamine or ethanol, to produce an adduct useful to crosslink the curable polyurethane elastomer of the present invention.

Where a solvent is used with the curable polyurethane elastomer it generally consists of a combination of an aromatic hydrocarbon and an aliphatic ketone. Suitable aromatic hydrocarbons include benzene, toluene, xylene, ethyl benzene and the like. Suitable aliphatic ketones have from 3 to 9 carbon atoms and include acetone, methylethyl ketone, diethyl ketone, methylpropyl ketone, dibutyl ketone and the like. The solution concentration can vary, depending upon the choice of solvents, but will generally be in the range of about 10 to about 60 weight percent solids, preferably about 30 to 50 weight percent solids, based upon the weight of the solution. The curable elastomer can be applied undiluted by appropriate reduction in molecular weight of the prepolymer as described hereinbefore.

The temporary carrier used in the process of the invention can be any suitable surface which is wet by the polyurethane component of the elastomeric coating composition, that is, the surface possesses a high degree of adhesive affinity for the polyurethane component of the coating solution employed in this invention. The temporary carrier can be paper such as kraft paper or a polished or textured metal web or a fabric.

The following examples are presented to illustrate the invention. It is to be understood that the examples are not to be construed as limiting the invention. In the specification and claims, all temperatures are given in degrees Centigrade and all parts are by weight unless otherwise indicated.

EXAMPLE 1

An elastomeric curing polyurethane prepolymer was prepared of components comprising 200 parts of a linear hydroxyl terminated diethylene glycol-adipate polyester of 2,000 molecular weight and 150 parts of toluene diisocyanate. The mixture was heated at 70° C until the prepolymer was formed. The polymer was then dispersed in a 50/50 mixture of toluene and methylethyl ketone, made up to 40 percent solids concentration and 1.6 percent of methoxy methyl melamine and 0.16 percent of a 10 percent solids solution in dimethyl formamide of the morpholine salt of toluene sulfonic acid were added as curing agent and catalyst, respectively. The viscosity of the polymer solution was about 10,000 centipoises when measured at 25° C.

EXAMPLE 2

Using the curing polyurethane prepolymer prepared in Example 1, a coating solution was made up by combining 60 parts of the curable polyurethane elastomer solution with 15 parts of a diethylene glycol adipate polyester having a mean molecular weight of 6,000 and hydroxyl groups at both ends. This polyester was made up to 90 percent solids by combining with toluene and contained 4.5 percent methoxy methyl melamine and 0.2 percent of a solution of the morpholine salt of toluene sulfonic acid, 10 percent solids in dimethyl formamide. A dimethyl polysiloxane silicone oil of 10,000 centistokes viscosity was next added to the extent of 0.7 part. Next was added 3 parts of a methylethyl ketoxime blocked polyisocyanate adduct. The coating formulation is completed by the addition of 10 parts of dimethyl formamide to adjust viscosity at 25° C to 8,000 to 9,000 centipoises, Brookfield. A 15 wet mil thick coating was applied to a 70-pound basis weight kraft paper using a knife-coating apparatus, in which the knife is situated over a roller. The machine speed used was 3 yards per minute. Immediately after application of the coating to the kraft paper, a napped fabric was laminated to the exposed wet film so as to allow the polymer solution to impregnate the nap of the fabric. The coating was then dried at 180° F in a first oven which is 6 feet long, and subsequently dried in a second oven which is 12 feet long maintained at a temperature of 250° F. The kraft paper was then separated from the polymer coating by rolling the kraft onto one roll and feeding the napped fabric which is adhered to the polyurethane elastomer coating back into the coating machine. The coated fabric was, next, passed through an oven maintained at a temperature of 380° F, so as to completely cure the coating. The resulting product was an artificial suede leather having a pleasing suede-like surface and hand and unusually good resistance to abrasion. Tests made on a Wyco abrader using No. 8 duct CCCT–191b–5304 showed no failure after 100,000 cycles.

Various changes and modifications can be made in the process of this invention without departing from the spirit and scope of the invention. The various embodiments of the invention disclosed herein serve to further illustrate the invention but are not intended to limit it.

What is claimed is:

1. A method for producing synthetic suede-like leather consisting of the following steps:
   1. applying a curable elastomeric coating composition consisting of (a) a curable elastomeric composition and a cross-linking agent dissolved in solvent or (b) a liquid curable mixture comprising a polyurethane prepolymer, a polyester polyol and a hydroxy reactive compound onto a temporary paper or metal web carrier which is wet by the elastomer to form a coating layer of said composition;
   2. laminating a napped fabric substrate to the resulting coated layer to form a composite article;

3. heating said composite article in an oven to dry and partially cure said coating;
4. peeling said substrate from said temporary carrier whereby a layer of said coating composition remains on said carrier and whereby a layer of said coating composition having a suede-like leather appearance remains on said substrate, and
5. completing the cure of said coating composition remaining on said substrate.

2. The method of claim 1 wherein said curable elastomeric coating composition has a thickness of from about 5 to about 25 mils.

3. The method of claim 2 wherein said curable elastomeric composition (a) comprises a curable elastomeric polyurethane polymer of from about 10 to about 60 percent solids by weight and has a viscosity of between 1,000 and 12,000 centipoises.

4. The method of claim 1 wherein said suede-like-leather obtained in step (4) is embossed prior to curing.

5. The method of claim 1 wherein said polyester polyol is present in the amount by weight based upon the weight of said polyurethane prepolymer of from about 20 to 70 percent.

6. The method of claim 2 wherein said curable elastomeric composition (a) comprises a mixture of a solid curable elastomeric polyurethane polymer and a curable rubber.

7. The method of claim 2 wherein said curable elastomeric composition (a) comprises a mixture of a solid curable elastomeric polyurethane, a curable rubber, and a polymer of suitable pliability selected from the group consisting of vinyl polymers and copolymers, poly-alpha-methyl styrene, polyamides, polyester-amides and polyesters.

8. The method of claim 2 wherein said curable elastomeric composition (a) comprises a mixture of a solid curable elastomeric polyurethane and a polymer of suitable pliability selected from the group consisting of vinyl polymers and copolymers, poly-alpha-methyl styrene, polyamides, polyester-amides and polyesters.

9. The method of claim 1 wherein said solvent comprises a combination of an aromatic hydrocarbon and an aliphatic ketone.

10. A synthetic suede-like leather produced by the method of claim 1.

* * * * *